Dec. 17, 1968   C. N. COOPER   3,416,809
SELF-CENTERING CHUCK MECHANISM
Filed Aug. 26, 1965   4 Sheets-Sheet 1
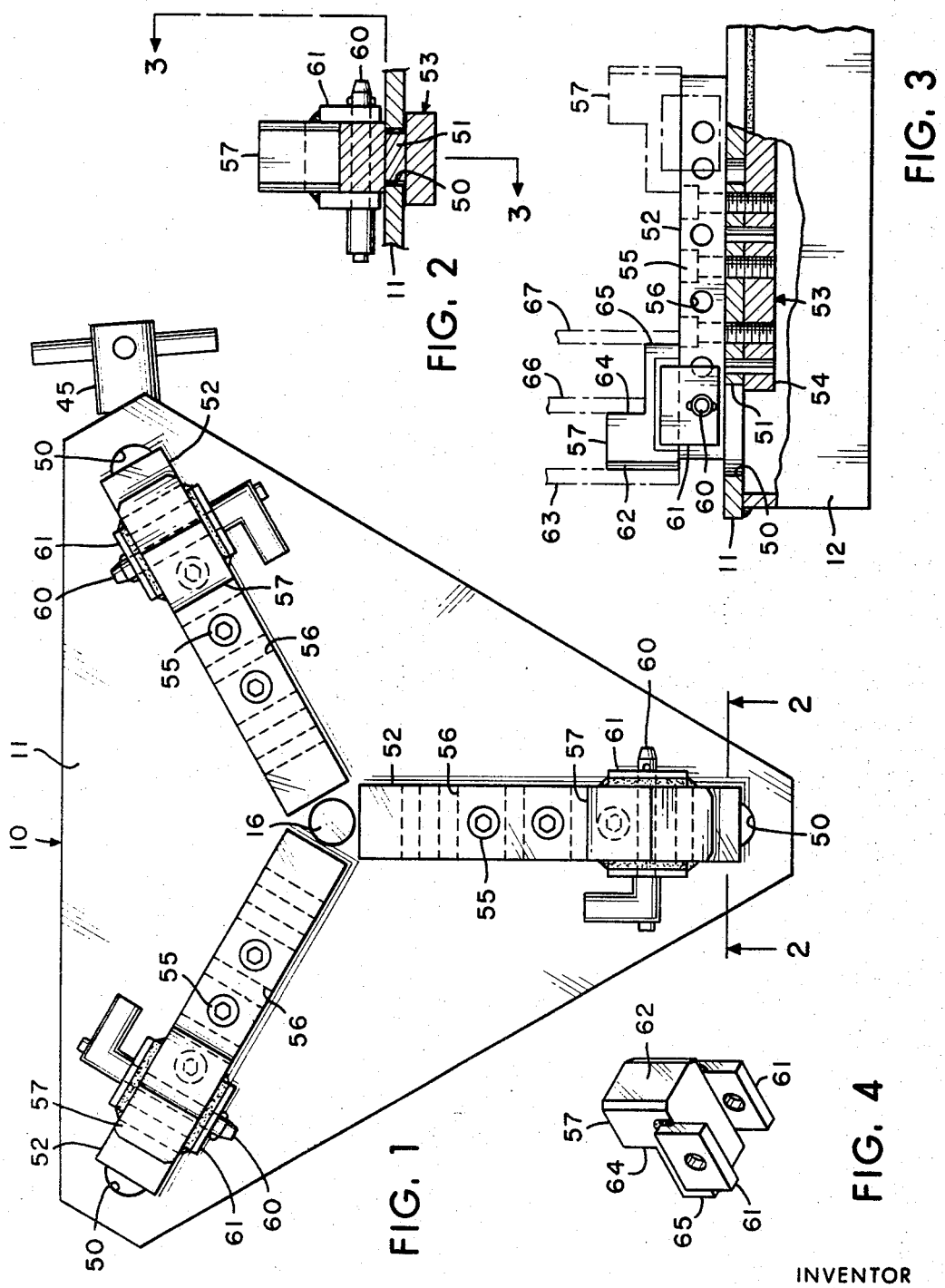
INVENTOR
CLEVELAND N. COOPER
BY
Cohn and Powell
ATTORNEYS

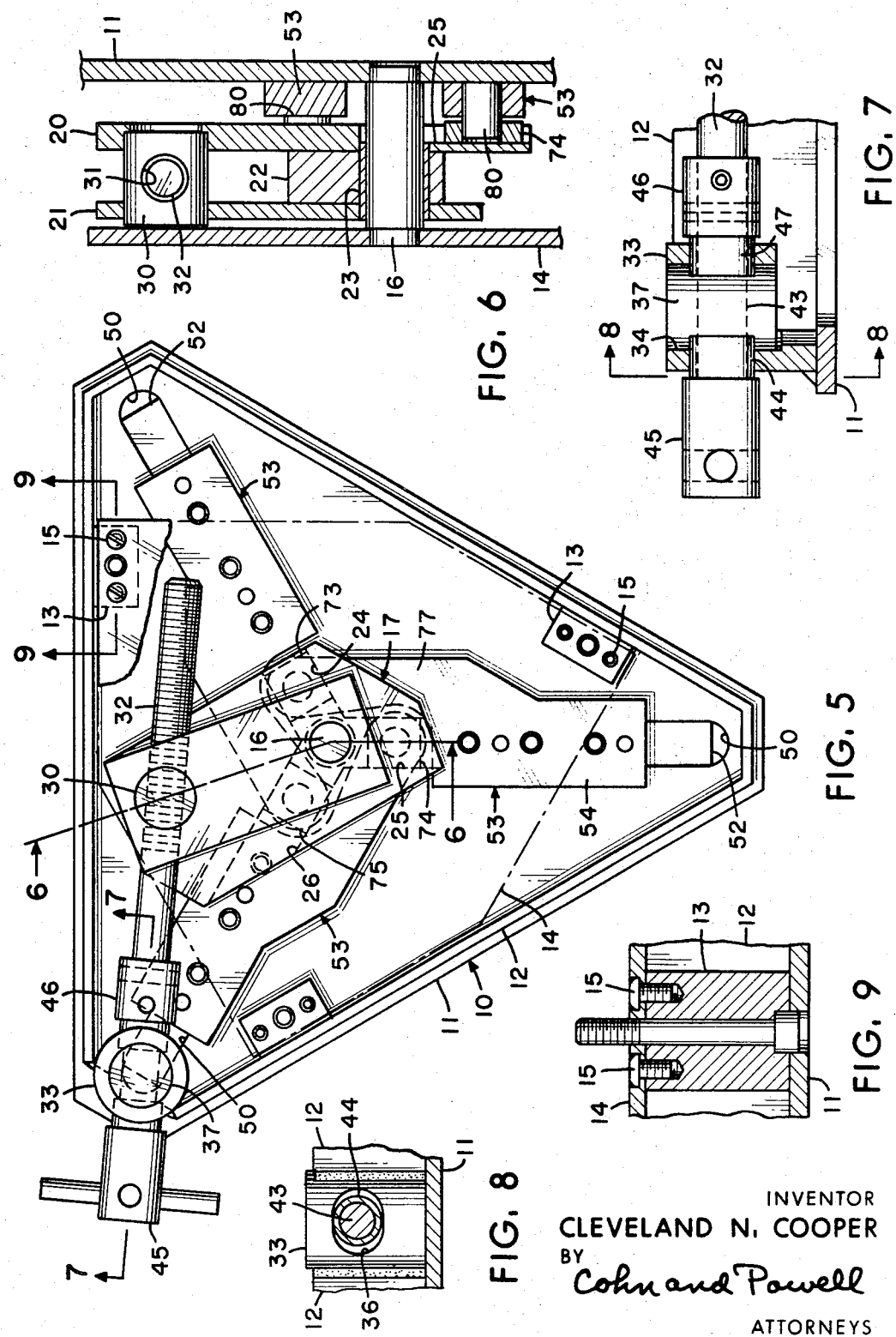

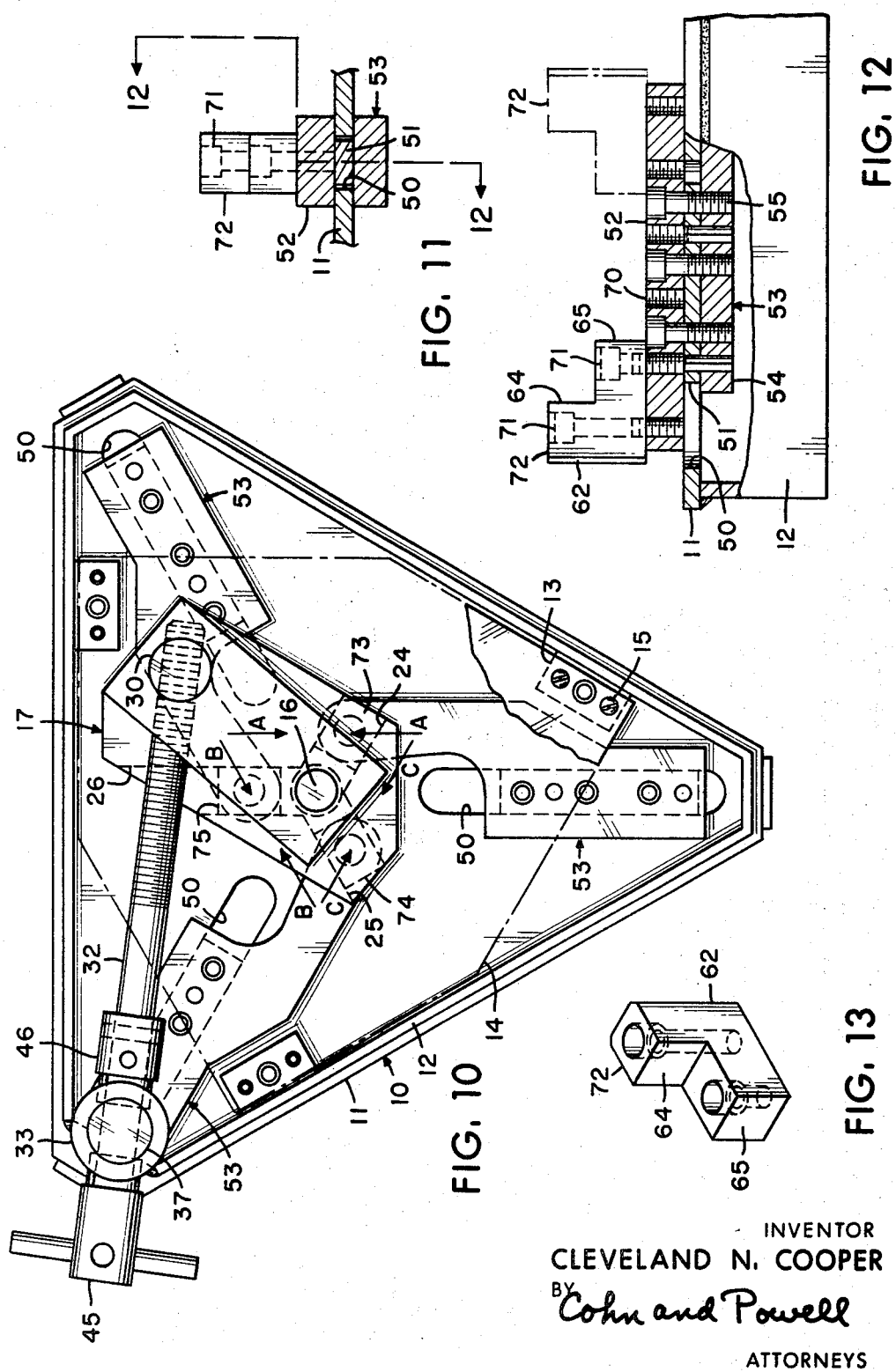

Dec. 17, 1968  C. N. COOPER  3,416,809
SELF-CENTERING CHUCK MECHANISM
Filed Aug. 26, 1965  4 Sheets-Sheet 4

INVENTOR
CLEVELAND N. COOPER
BY Cohn and Powell
ATTORNEYS

United States Patent Office 3,416,809
Patented Dec. 17, 1968

3,416,809
SELF-CENTERING CHUCK MECHANISM
Cleveland N. Cooper, Kirkwood, Mo., assignor to The Pandjiris Weldment Co., a corporation of Missouri
Filed Aug. 26, 1965, Ser. No. 482,718
10 Claims. (Cl. 279—110)

ABSTRACT OF THE DISCLOSURE

A chuck mechanism having an oscillatively mounted actuator that is provided with a keyway extending radially to an axis. A slide member is mounted for movement toward and away from such axis. Means interconnect a key block slidably mounted in the keyway and the slide member. The actuator is oriented so that the keyway extends in a direction substantially transverse to the direction of travel of the slide member and associated jaw. The key block slides in the keyway upon oscillative movement of the actuator to cause reciprocative movement of the slide member and associated jaw between limits.

---

Figure 14:
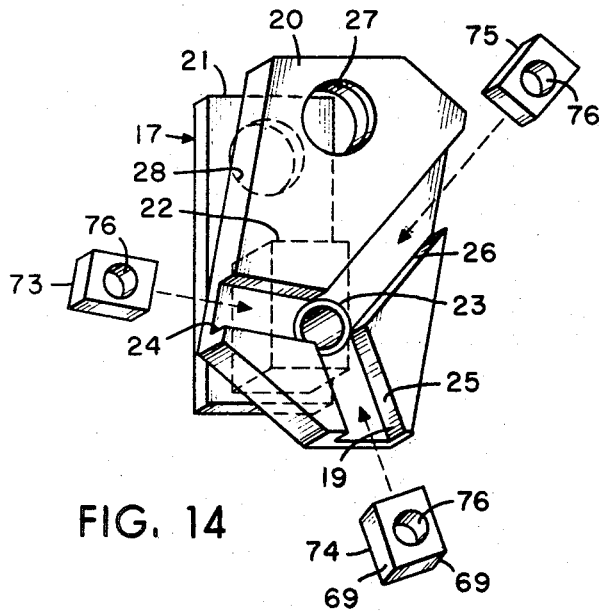

This invention relates generally to improvements in a self-centering chuck mechanism, and more particularly to an improved three-jaw chuck adapted to hold and position a workpiece during welding operation.

Certain features of the present disclosure are described and claimed in U.S. Patent No. 3,156,480 issued Nov. 10, 1964, and entitled "Self-Centering Chuck Mechanism," owned by the common assignee.

An important objective is to provide an improved mechanism for adjusting the linear position of a plurality of chuck jaws so that such jaws will exert pressure on either the external or internal surfaces of a cylindrical tank wall incident to holding the tank in the chuck and to maintaining a seam for welding.

It is an important object to achieve a jaw-adjusting mechanism using a minimum of components which converts the rotary motion of a central actuator to linear movement of the jaws effectively and efficiently so that the jaws exert tremendous pressures on a tank or pipe wall with minimal manual effort.

An important object is afforded by a chuck mechanism in which an actuator, oscillatively mounted to a frame, is provided with a groove in which a bearing follower is slidably mounted, the bearing follower being pivotally connected to a slide member reciprocatively mounted on the frame. The actuator is orientated so that the bearing follower slides within the groove upon oscillative movement of the actuator to cause reciprocative movement of the slide member and associated jaw between limits.

Another important objective is attained by mounting the slide member on the frame for reciprocative movement toward or away from an axis, and by oscillatively mounting the actuator on the same axis, the actuator being provided with a keyway extending radially to the axis in which a key block is slidably mounted.

Yet another important objective is realized by orientating the actuator so that the keyway extends in a direction substantially transverse to the direction of travel of the jaw, the key block sliding within the keyway upon oscillative movement of the actuator to cause reciprocative movement of the slide member and jaw between limits.

An important object is to provide a structural arrangement for converting the rotary motion of the actuator to a linear reciprocating movement of the jaw by orientating the actuator so that a chordal line to the operating arc drawn through the pivot means interconnecting the key block and slide element at the travel limits of the jaw is substantially parallel to the travel direction of the jaw.

Another important object is achieved by mounting the slide member on the frame for reciprocative, linear movement toward or away from an axis and by mounting the jaw on the slide member so that the jaw moves radially to such axis, and by interconnecting the bearing block and the slide member with a pivot pin so that the pivot pin moves in a line substantially parallel to the radial line of movement of the jaw as the bearing block slides within the groove of the actuator when the groove moves angularly from one side to the other of a line perpendicular to the radial line of movement of the jaw upon oscillation of the actuator.

Still another important objective is afforded by the provision of a plurality of slide members mounted on the frame for reciprocative movement toward or away from the axis, by the provision of a plurality of keyways in the actuator extending radially to the axis, by the provision of a key block slidably mounted in each keyway, and by the provision of means pivotally interconnecting each key block with an associated slide member, whereby oscillative movement of the actuator will cause reciprocative movement of the jaws radially toward or away from the common axis so as to clamp a workpiece.

An important objective is to provide a three-jaw chuck mechanism that is simple and durable in construction, economical to manufacture and assemble, highly efficient in operation, and which can be utilized by anyone with little or no instruction.

Figure 16:
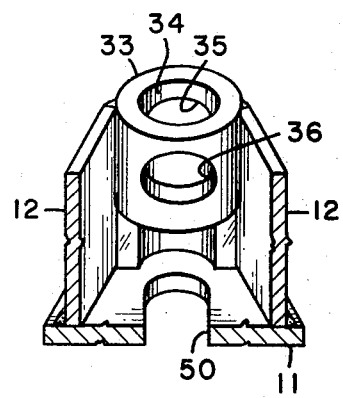
Figure 17:
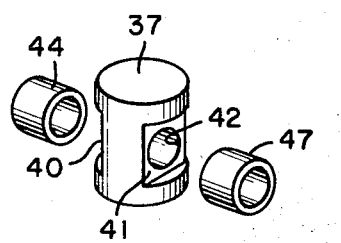
Figure 15:
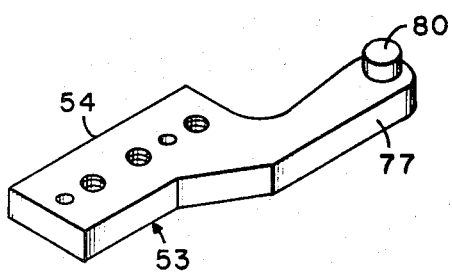

The foregoing and numerous other objects and advantages of the invention will more clearly appear from the following detailed description of a preferred embodiment, particularly when considered in connection with the accompanying drawings, in which:

FIG. 1 is a top plan view of the chuck mechanism;
FIG. 2 is a fragmentary cross-sectional view taken along line 2—2 of FIG. 1;
FIG. 3 is a fragmentary, partially cross-sectional view taken along staggered line 3—3 of FIG. 2;
FIG. 4 is a perspective view of a chuck jaw;
FIG. 5 is a bottom plan view of the chuck mechanism showing the component parts in a position with the slide members fully retracted;
FIG. 6 is an enlarged, cross-sectional view taken along line 6—6 of FIG. 5;
FIG. 7 is an enlarged, fragmentary cross-sectional view taken along line 7—7 of FIG. 5;
FIG. 8 is a fragmentary cross-sectional view taken along line 8—8 of FIG. 7;
FIG. 9 is an enlarged, fragmentary, cross-sectional view taken along line 9—9 of FIG. 5;
FIG. 10 is a bottom plan view of the chuck mechanism, similar to FIG. 5, but showing the component parts in a position with the slide members fully extended;
FIG. 11 is a fragmentary cross-sectional view, similar to FIG. 2, but showing a modified jaw and mounting therefor;
FIG. 12 is a fragmentary, partially cross-sectional view taken along staggered line 12—12 of FIG. 11;
FIG. 13 is a perspective view of the modified jaw utilized in FIGS. 11 and 12;
FIG. 14 is a perspective view of the actuator with the associated key blocks removed from their coacting keyways for clarity;
FIG. 15 is a perspective view of a slide member;
FIG. 16 is a perspective view of the cylindrical post mounting the actuating screw, and
FIG. 17 is an exploded, perspective view of the cylindrical pivot pin and sleeves utilized in mounting the actuating screw shaft.

Referring now by characters of reference to the drawings, and first to FIG. 5, it is seen that the device includes a substantially triangular frame generally indicated by 10 having a top plate 11 and depending side aprons 12. Secured to an intermediate portion of each side apron 12 is an inwardly extending bracket 13. A bottom plate 14 is secured to the brackets 13 by a plurality of screws 15.

Fixed to and extending between the top plate 11 and the bottom plate 14 is a pin 16 that defines a common center axis. Rotatively mounted on the pin 16 is an actuator generally indicated by 17, the structure of which is perhaps best illustrated in FIGS. 6 and 14. It will be understood that the actuator 17 includes a pair of spaced plates 20 and 21 interconnected by a spacer 22. A tubular bushing 23 extends through the actuator plates 20 and 21 and through the intervening spacer 22, the bushing 23 being rotatively mounted on and receiving the pin 16.

The top face of actuator plate 20 is provided with three angularly spaced keyways 24, 25 and 26, constituting grooves, that extend radially from the common center axis formed by pin 16, each of the keyways being defined by opposed and parallel bearing margins. The purpose and function of these keyways 24–26 inclusive will become apparent upon later description of parts.

As is seen in FIG. 14, the actuator plates 20 and 21 are provided with aligned circular apertures 27 and 28. Located within the apertures 27 and 28 and retained by and between the actuator plates 20 and 21 is a cylindrical nut 30, the nut 30 being rotatable on an axis aligned in the same direction with and parallel to the axis defined by pin 16. Formed through the cylindrical nut 30 is a threaded bore 31 adapted to receive a threaded shaft 32.

From FIGS. 7, 8 and 16, it will be apparent that at one juncture of converging side aprons 12, the frame 10 is closed by a substantially cylindrical and tubular post 33 having a bore 34 therethrough. Formed through opposite sides of the cylindrical post 33 are a pair of transversely aligned, oval-shaped holes 35 and 36. Rotatively mounted in the bore 34 is a cylindrical pivot pin 37 having oppositely facing flat sides 40 and 41. A bore 42 is formed through the pivot pin 37, and specifically through the flat sides 40 and 41.

Extending through the pin bore 42 is a stub shaft 43, the shaft 43 extending outwardly through the oval-shaped holes 35 and 36. One end of the stub shaft 43 extends through a circular sleeve 44, one end of which engages the flat side 40 of pin 37. A manipulating handle 45 is attached to this end of the stub shaft 43 outwardly of the frame 10, the handle 45 being adapted to turn the stub shaft 43. The inner end of handle 45 clamps the sleeve 44 between it and the pivot pin 37, the sleeve 44 being located and movable transversely within the oval-shaped hole 35.

The opposite end of the stub shaft 43 is provided with a coupling 46. Located between the coupling 46 and the flat side 41 of pin 37 is another sleeve 47 located about the stub shaft 43. The sleeve 47 is located and transversely movable in the oval-shaped hole 36.

The elongate threaded screw shaft 32 is pinned to the coupling 46 and is rotatable therewith. Upon turning the handle 45, the stub shaft 43 will act to rotate the screw shaft 32 through the coupling 46. Upon rotation of the screw shaft 32, the cylindrical nut 30 will move longitudinally along the threads of shaft 32, causing a rotation of the actuator 17. The nut 30 rotates in its mounting relative to the spaced plates 20 and 21 during oscillation of the actuator 17, and the threaded end of the shaft 32 moves in an arc to accommodate the turning of the actuator 17. As the shaft 32 moves in the arc, the stub shaft 43 will rotate the pin 37 within the cylindrical post 33, the sleeves 44 and 47 moving transversely in their associated oval-shaped holes 35 and 36 respectively.

The top plate 11 of frame 10 is provided with a plurality (a total of three in the embodiment illustrated) of elongate, relatively narrow guide slots 50 extending longitudinally in a direction toward and away from the common axis defined by pin 16. More specifically the slots 50 extend radially to and from the common axis defined by pin 16. One of the elongate slots 50 extends toward each corner of the triangular frame 10.

Slidably disposed in each of the guide slots 50 is a key strip 51. Located on one side of the key strip 51 and above the top plate 11 is an elongate bar 52, the bar 52 being of a width sufficient to extend across and cover the guide slot 50. Disposed on the other side of the key strip 51 and below the top plate 11 is a slide member 53, the slide member 53 having a first portion 54 located below and covering the bottom of elongate slot 50. As will best appear from FIG. 3, a plurality of bolts 55 secure the key strip 51, bar 52 and the first portion 54 of slide member 53 together as a unit. This structure moves as a unit toward and away from the axis of pin 16 as guided by the movement of key strip 51 in guide slot 50.

Each upper bar 52 is provided with a series of regularly spaced holes 56 extending through its side. A jaw 57 is fixed to each upper bar 52 by a locking pin 60 extending through side flanges 61 depending from the jaw body and embracing opposite sides of the bar 52, the locking pin 60 extending selectively through one of the holes 56 whereby to secure the jaw 57 in any one of a plurality of different positions along bar 52. Reciprocative movement of the slide members 53 causes a radial movement of the jaws 57 to and from the axis of pin 16.

The jaw 57 is provided with serrations on one face 62 adapted to engage a workpiece 63 incident to exerting an outward pressure. In addition, each jaw 57 is of a stepped construction to provide two separate serrated rear faces 64 and 65 adapted to engage workpieces 66 and 67 respectively incident to exerting an inward pressure.

As disclosed by broken lines in FIG. 3, the jaw 57 can be relatively reversed or turned around on and attached to the upper bar 52 in order to obtain additional and more flexible usage of the serrated jaw faces 62, 64 and 65.

A modified jaw construction and mounting is illustrated in FIGS. 11–13 inclusive. For example, the top bar 52 is provided with a plurality of regularly spaced tapped holes 70 adapted to receive a pair of bolts 71 extending through the jaw 72. Similarly, the jaw can be selectively secured in any one of a plurality of different positions along bar 52. Similar to the corresponding jaw 57 of FIGS. 2–4, the jaw 72 of FIGS. 11–13 is provided with a serrated face 62 adapted to engage a workpiece incident to exerting an outward pressure, and is provided with a stepped construction to form two separate serrated rear faces 64 and 65 adapted to engage workpieces incident to exerting an inward pressure. This jaw 72 can be relatively reversed and attached to the top bar 52, as illustrated in broken lines in FIG. 12, to obtain additional functional advantages and clamping uses of the serrated faces 62, 64 and 65.

Slidably disposed in the keyways 24–26 are substantially square-shaped key blocks 73–75 respectively. Each key block 73–75 includes oppositely facing bearing surfaces slidably engaging the opposed bearing margins defining its associated keyway 24–26 respectively, whereby the key block is moved reciprocatively in a direction toward or away from, and specifically radially with respect to, the common axis defined by pivot pin 16. Each of the key blocks 73–75 is provided with a smooth bore 76, constituting a pivot journal as will be described.

As is best seen in FIG. 15, each slide member 53 includes a second portion 77 that is laterally offset from the first portion 54, the second slide member portion 77 carrying a pivot pin 80 at its outer end. When assembled, the pivot pin 80 of each slide member 53 rotatively interfits in the smooth bore 76 of one of the key blocks 73—73. From FIGS. 5 and 10, it will be understood that the actuator 17 is angularly disposed so that each slide member 53 is pivotally connected by its pin 80 to the key block that is located in the associated keyway extending transversely to the direction of travel of such slide member 53.

In the preferred embodiment, the actuator 17, and hence the keyways 24–26 will oscillate within a limited angular range, as for example, 60 degrees, in order to move the slide members 53, and hence the jaws 57 carried thereby, reciprocatively between their retracted and extended limits. Again, preferably, the associated keyway for each slide member 53 extends linearly and radially substantially at right angles to the linear and radial direction of travel of such slide member 53 when the slide member 53 is located midway between its limits. As shown in FIG. 5, each keyway 24–26 is angularly related substantially at 30 degrees from the perpendicular to the radial direction of travel of the associated slide member 53 when the slide member 53 is in its fully retracted limit. It will be noted that the offset construction of the slide member portions 54 and 77 enable an interfitting nesting relationship of the slide members 53 without interference when the slide members 53 are fully retracted. From FIG. 10, it is similarly shown that each keyway 24–26 is angularly related substantially at 30 degrees from the opposite side of the perpendicular to the direction of travel of the associated slide member 53 when the slide member is fully extended.

During reciprocative movement of the slide members 53 between their retracted and extended limits, the associated key blocks 73–75 will reciprocatively move within their associated keyways 24–26. It will be apparent that the pivot pin 80 of each slide member 53 moves in a path of travel that is parallel to the radial direction of jaw travel. During oscillative movement of the actuator 17 between its angular limits, incident to reciprocatively moving the slide members 53 between their limits, the pivot pin 80 of each slide member 53 will move in a chordal line (indicated by arrows A—A in FIG. 10) to the operating arc drawn through the pivot pin 80 at the travel limits of the associated jaw substantially parallel to the radial travel direction of the associated jaw.

It is thought that the operation and functional advantages have become fully apparent from the foregoing detailed description of parts, but for completeness of disclosure, the usage of the chuck will be briefly described.

It will be assumed that the jaws 57 are fixed to the upper bars 52 in the appropriate position to accommodate the particular size of the workpiece involved. For example, it will be assumed that the jaws 57 are attached in a position illustrated in FIG. 3 so that the serrated faces 64 engage a workpiece 66 that is located over the frame 10 between the jaws 57. With this arrangement, it is desired to exert an inward pressure on the workpiece 66 to clamp the workpiece 66 in place.

It will be assumed that the initial position of the component parts of the operating mechanism is disposed and located as is illustrated in FIG. 10 in which the jaws 57 and the associated slide members 53 are fully extended. The operator turns the handle 45 in order to rotate the screw shaft 32. Upon shaft rotation, the nut 30 moves relatively axially along the threads of shaft 32 in order to rotate the actuator 17 counterclockwise from the position shown in FIG. 10 toward the position illustrated in FIG. 5. To accomplish this result, it will be realized that the nut 30 rotates in its mounting on the spaced actuator plates 20 and 21 and that the threaded end of shaft 32 swings in a small arc.

As the actuator 17 is initially turned counterclockwise (FIG. 10) the key blocks 73–75 will move inwardly along their keyways 24–26, and will act through pivot pins 80 to move the slide members 53 inwardly from the fully extended position. The size of the workpiece involved will determine the extent to which the slide members 53 and their associated jaws 57 need be retracted in this manner. For purposes of illustration only, and in order to show the full operation of the component parts, it will be assumed that the workpiece is very small and that the slide members have to be moved nearly to their fully retracted position, as shown in FIG. 5.

As the actuator 17 continues to turn in the counterclockwise direction, the keyways 24–26 will move angularly to a position in which they are disposed radially at right angles to the radial direction of movement of the associated jaws. In this position the key blocks 73–75 are disposed in their inwardmost position relative to the keyways 24–26, and the bearing margins between the key blocks 73–75 and keyways 24–26 are at substantially right angles to the radial direction of jaw travel. Then, as the actuator 17 continues to rotate in the counterclockwise direction, the keyways 24–26 will move angularly to the other side of the perpendicular line described previously, and the key blocks 73–75 will move outwardly in their associated keyways 24–26 and eventually reach their outermost position in the keyways 24–26 when the slide members are fully retracted. Obviously, the reciprocative movement of the key blocks 73–75 in the associated keyways 24–26 maintains the direction of travel of the pivot pins 80 of the associated slide members 53 in a linear path along the respective chordal lines A—A, B—B and C—C substantially parallel to the radial line of movement of the jaw 57.

To extend the slide members 53 and the associated jaws 57 from the fully retracted position shown in FIG. 5 to the fully extended position of FIG. 10 involves a mere reversal of the above explained sequence of operation.

The above described structural arrangement of the keyways 24–26, their angular relationships to the associated slide members 53 and radial directions of jaw travel, the connection of the slide members 53 through the pivot pins 80 to the key blocks 73–75, and the restricted path of travel of the pivot pins 80 upon reciprocative action of the key blocks 73–75 in their associated keyways 24–26, all cooperate to achieve efficient vectorial transfer of the clamping force to the slide members 53 and jaws 57 and to minimize side thrust forces causing frictional losses.

It will be readily understood that this mechanism can be conveniently and advantageously utilized to exert tremendous pressure to the jaws 57 in either direction, that is, toward or away from the common axis defined by pin 16. The jaws 57 can be easily removed and attached to the upper bars in order to accommodate the workpieces within a wide range of sizes.

Although the invention has been described by making detailed reference to a preferred embodiment, such detail is to be understood in an instructive, rather than in any restrictive sense, many variants being possible within the scope of the claims hereunto appended.

I claim as my invention:

1. In a chuck mechanism:
   (a) a frame,
   (b) a slide member mounted on the frame for reciprocative movement toward or away from an axis,
   (c) a jaw carried by the slide member,
   (d) an actuator oscillatively mounted on the axis, the actuator being provided with a keyway extending radially to the axis,
   (e) a key block slidably mounted in the keyway, and
   (f) means pivotally interconnecting the key block and slide member,
   (g) the actuator being orientated so that the keyway extends in a direction substantially transverse to the direction of travel of the slide member and jaw,
   (h) the key block sliding within the keyway upon oscillative movement of the actuator to cause reciprocative movement of the slide member and jaw between limits.

2. In a chuck mechanism:
   (a) a frame,
   (b) a slide member mounted on the frame for reciprocative movement toward or away from an axis, the slide member including a first portion aligned and movable radially to the axis, and a second portion offset laterally from the first portion,
(c) a jaw carried by the first portion of the slide member,
(d) an actuator oscillatively mounted on the axis, the actuator being provided with a keyway extending radially to the axis, the actuator being orientated so that the keyway extends in a direction substantially transverse to the direction of travel of the slide member and jaw,
(e) a key block slidably mounted in the keyway, and
(f) means pivotally interconnecting the key block and the second portion of the slide member,
(g) the key block sliding within the keyway upon oscillative movement of the actuator to cause reciprocative movement of the slide member and jaw between limits.

3. In a chuck mechanism:
(a) a frame,
(b) a slide member mounted on the frame for reciprocative movement toward or away from an axis,
(c) a jaw carried by the slide member,
(d) an actuator oscillatively mounted on the axis, the actuator being provided with a keyway extending radially to the axis,
(e) a key block slidably mounted in the keyway, and
(f) means pivotally interconnecting the key block and slide member,
(g) the actuator being orientated so that a chordal line to the operating arc drawn through the pivot means at the travel limits of the jaw is substantially parallel to the direction of travel of the jaw.

4. In a chuck mechanism:
(a) a frame,
(b) a slide member mounted on the frame for reciprocative, linear movement toward or away from an axis on a line of movement radial to the axis,
(c) a jaw carried by the slide member and movable radially to the axis,
(d) an actuator oscillatively mounted on the axis, the actuator being provided with a linear groove extending radially to the axis,
(e) a bearing block slidably mounted in the groove, and
(f) a pivot pin interconnecting the block and slide member, the pivot pin moving in a line substantially parallel to the radial line of movement of the jaw as the bearing block slides within the groove when the groove moves angularly from one side to the other of a line perpendicular to the radial line of movement of the jaw upon oscillation of the actuator, thereby causing reciprocative movement of the slide member and jaw between limits.

5. In a chuck mechanism:
(a) a frame,
(b) a plurality of slide members mounted on the frame for reciprocative, linear movement toward or away from an axis, each slide member including a first portion movable radially to the axis, and a second portion laterally offset to the first portion.
(c) a jaw carried by the first portion and movable radially to the axis,
(d) an actuator oscillatively mounted on the axis, the actuator being provided with a plurality of linear grooves extending radially to the axis, the actuator being orientated so that each groove extends in a direction substantially transverse to the travel direction of an associated jaw.
(e) a bearing block slidably mounted in each groove, and
(f) a pivot pin interconnecting each bearing block with the said second portion of an associated slide member, the pivot pin moving in a line substantially parallel to the radial line of movement of the jaw as the bearing block slides within the groove when the groove moves angularly from one side to the other of a line perpendicular to the radial line of movement of the jaw opon oscillation of the actuator, thereby causing reciprocative movement of the slide member and jaw between limits.

6. In a chuck mechanism:
(a) a frame,
(b) a slide member mounted on the frame for reciprocative, linear movement toward or away from an axis,
(c) a jaw carried by the slide member,
(d) an actuator oscillatively mounted on the axis, the actuator being provided with a linear groove extending radially to the axis,
(e) a bearing block slidably mounted in the groove, and
(f) a pivot pin interconnecting the block and slide member,
(g) the bearing block slidably within the groove upon oscillative movement of the actuator to cause reciprocative movement of the slide member and jaw between limits,
(h) the actuator being orientated so that a chordal line to the operating arc drawn through the pivot pin at the travel limits of the jaw is parallel to the travel direction of the jaw.

7. In a chuck mechanism:
(a) a frame,
(b) a plurality of slide members mounted on the frame for reciprocative movement toward or away from a common axis,
(c) a jaw carried by each of the slide members,
(d) an actuator oscillatively mounted on the axis, the actuator being provided with a plurality of keyways extending radially to the axis,
(e) a key block slidably mounted in each keyway,
(f) means pivotally interconnecting each key block to an associated slide member,
(g) each slide member includes a first portion radially movable relative to the axis, and a second portion laterally offset from the first portion,
(h) the jaw being carried by the said first portion radially to the axis, and
(i) each pivot means interconnects one of the key blocks with an associated second portion of one slide member.

8. In a chuck mechanism:
(a) a frame,
(b) a plurality of slide members mounted on the frame for reciprocative movement toward or away from a common axis,
(c) a jaw carried by each of the slide members,
(d) an actuator oscillatively mounted on the axis, the actuator being provided with a plurality of keyways extending radially to the axis,
(e) a key block slidably mounted in each keyway,
(f) means pivotally interconnecting each key block to an associated slide member,
(g) the actuator being oriented so that each keyway extends in a direction substantially transverse to the direction of travel of an associated jaw, and
(h) the key blocks sliding within the keys upon oscillative movement of the actuator to cause reciprocative movement of the slide members and associated jaws between limits.

9. In a chuck mechanism:
(a) a frame,
(b) a plurality of slide members mounted on the frame for reciprocative movement toward or away from a common axis,
(c) a jaw carried by each of the slide members,
(d) an actuator oscillatively mounted on the axis, the actuator being provided with a plurality of keyways extending radially to the axis,
(e) a key block slidably mounted to each keyway, (f) means pivotally interconnecting each key block to an associated slide member, (g) each jaw being movable radially to the axis, and (h) the actuator being oriented so that a chordal line to the operating arc drawn through each of the pivot means at the travel limits of the associated jaw is substantially parallel to the travel direction of the jaw.

10. In a chuck mechanism:

(a) a frame, (b) a plurality of slide members mounted on the frame for reciprocative movement toward or away from a common axis, (c) a jaw carried by each of the slide members, (d) an actuator oscillatively mounted on the axis, the actuator being provided with a plurality of keyways extending radially to the axis, (e) a key block slidably mounted in each keyway, (f) means pivotally interconnecting each key block to an associated slide member, (g) each jaw being movable radially to the axis, (h) each slide member including a portion offset laterally from the radial line, and (i) each pivot means including a pivot pin interconnecting one of the key blocks with the offset slide member portion, each pivot pin moving in a line substantially parallel to the radial line of movement of the associated jaw as the key block slides within the keyway when the keyway moves angularly from one side to the other of a line perpendicular to the radial line of movement of the jaw upon oscillation of the actuator.

References Cited

UNITED STATES PATENTS

| | | | |
|---|---|---|---|
| 1,442,107 | 1/1923 | Vernaz | 279—114 |
| 2,592,782 | 4/1952 | Zweifel | 269—233 |
| 3,156,480 | 11/1964 | Wuesthoff | 279—119 |

ROBERT C. RIORDON, *Primary Examiner.*

E. A. CARPENTER, *Assistant Examiner.*